United States Patent
Shigeoka

(10) Patent No.: US 9,571,682 B2
(45) Date of Patent: Feb. 14, 2017

(54) IMAGE FORMING APPARATUS THAT IMPROVES PRINTING SPEED AND RECORDING MEDIUM

(71) Applicant: KYOCERA Document Solutions Inc., Osaka (JP)

(72) Inventor: Tatsuya Shigeoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/150,072

(22) Filed: May 9, 2016

(65) Prior Publication Data

US 2016/0381238 A1 Dec. 29, 2016

(30) Foreign Application Priority Data

Jun. 29, 2015 (JP) ................. 2015-129777

(51) Int. Cl.
| | |
|---|---|
| *G06K 15/00* | (2006.01) |
| *H04N 1/00* | (2006.01) |
| *H04N 1/23* | (2006.01) |
| *H04N 1/56* | (2006.01) |

(52) U.S. Cl.
CPC ........ *H04N 1/00649* (2013.01); *H04N 1/0032* (2013.01); *H04N 1/0057* (2013.01); *H04N 1/233* (2013.01); *H04N 1/56* (2013.01); *H04N 2201/0094* (2013.01)

(58) Field of Classification Search
USPC ...................................... 358/1.12
See application file for complete search history.

(56) References Cited

U.S. PATENT DOCUMENTS

| | | | | |
|---|---|---|---|---|
| 2002/0122679 A1* | 9/2002 | Omata | ................ | G03G 15/232 399/309 |
| 2004/0037600 A1* | 2/2004 | Eda | ...................... | G03G 15/657 399/388 |
| 2004/0184824 A1* | 9/2004 | Hirai | ..................... | G03G 15/70 399/21 |
| 2007/0280728 A1* | 12/2007 | Sezaki | .............. | G03G 21/1628 399/111 |
| 2010/0052239 A1* | 3/2010 | Honda | .................. | B65H 29/14 271/3.24 |

(Continued)

FOREIGN PATENT DOCUMENTS

JP      2013-88773 A      5/2013

*Primary Examiner* — Jerome Grant, II
(74) *Attorney, Agent, or Firm* — Stein IP, LLC

(57) ABSTRACT

An image forming apparatus according to one aspect of the disclosure includes a printing mechanism, a drawing data creating circuit, a medium supply circuit, and a charging circuit. The medium supply circuit performs: a primary supply supplying the printing medium to a specific position; and a secondary supply supplying the printing medium from the specific position to the printing mechanism. When the band-used color fixed as color by the drawing data creating circuit exists, the medium supply circuit starts the primary supply prior to completion of creating all the bands of the drawing data by the drawing data creating circuit. When the band-used color fixed as color by the drawing data creating circuit exists, the charging circuit performs the charging process in a case where the color for use is color, in starting the primary supply.

3 Claims, 7 Drawing Sheets

(56) References Cited

U.S. PATENT DOCUMENTS

| | | | |
|---|---|---|---|
| 2010/0098445 A1* | 4/2010 | Negishi | G03G 15/50 399/43 |
| 2010/0239295 A1* | 9/2010 | Mikutsu | G03G 15/2028 399/68 |
| 2012/0114359 A1* | 5/2012 | Yura | G03G 15/2078 399/70 |
| 2016/0176677 A1* | 6/2016 | Mizuguchi | B65H 85/00 271/3.19 |

* cited by examiner

IMAGE FORMING APPARATUS THAT IMPROVES PRINTING SPEED AND RECORDING MEDIUM

INCORPORATION BY REFERENCE

This application is based upon, and claims the benefit of priority from, corresponding Japanese Patent Application No. 2015-129777 filed in the Japan Patent Office on Jun. 29, 2015, the entire contents of which are incorporated herein by reference.

BACKGROUND

Unless otherwise indicated herein, the description in this section is not prior art to the claims in this application and is not admitted to be prior art by inclusion in this section.

There is known an image forming apparatus that includes a printing unit, a drawing data creating unit, and a medium supply unit. The printing unit performs printing on a printing medium. The drawing data creating unit creates drawing data, which causes the printing unit to perform printing. The medium supply unit supplies the printing medium to the printing unit. This medium supply unit performs a primary supply and a secondary supply. The primary supply supplies the printing medium to a specific position. The secondary supply supplies the printing medium from the specific position to the printing unit. A typical image forming apparatus starts the primary supply prior to completion of creating the drawing data. This ensures the improved printing speed compared with a configuration that starts the primary supply after completion of creating the drawing data.

SUMMARY

An image forming apparatus according to an aspect of the disclosure includes a printing mechanism, a drawing data creating circuit, a medium supply circuit, and a charging circuit. The printing mechanism prints on a printing medium. The drawing data creating circuit creates drawing data for each band in order, the drawing data causing the printing mechanism to print. The medium supply circuit supplies the printing medium to the printing mechanism. The charging circuit performs a charging process for printing. The medium supply circuit performs: a primary supply supplying the printing medium to a specific position; and a secondary supply supplying the printing medium from the specific position to the printing mechanism. The drawing data creating circuit fixes a band-used color used for each band in printing, performed based on the drawing data by the printing mechanism, to one of monochrome and color, the drawing data creating circuit fixing a color for use in printing, performed based on the drawing data by the printing mechanism, to one of monochrome and color. When the band-used color fixed as color by the drawing data creating circuit exists, the medium supply circuit starts the primary supply prior to completion of creating all the bands of the drawing data by the drawing data creating circuit. When the band-used color fixed as color by the drawing data creating circuit exists, the charging circuit performs the charging process in a case where the color for use is color, in starting the primary supply.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
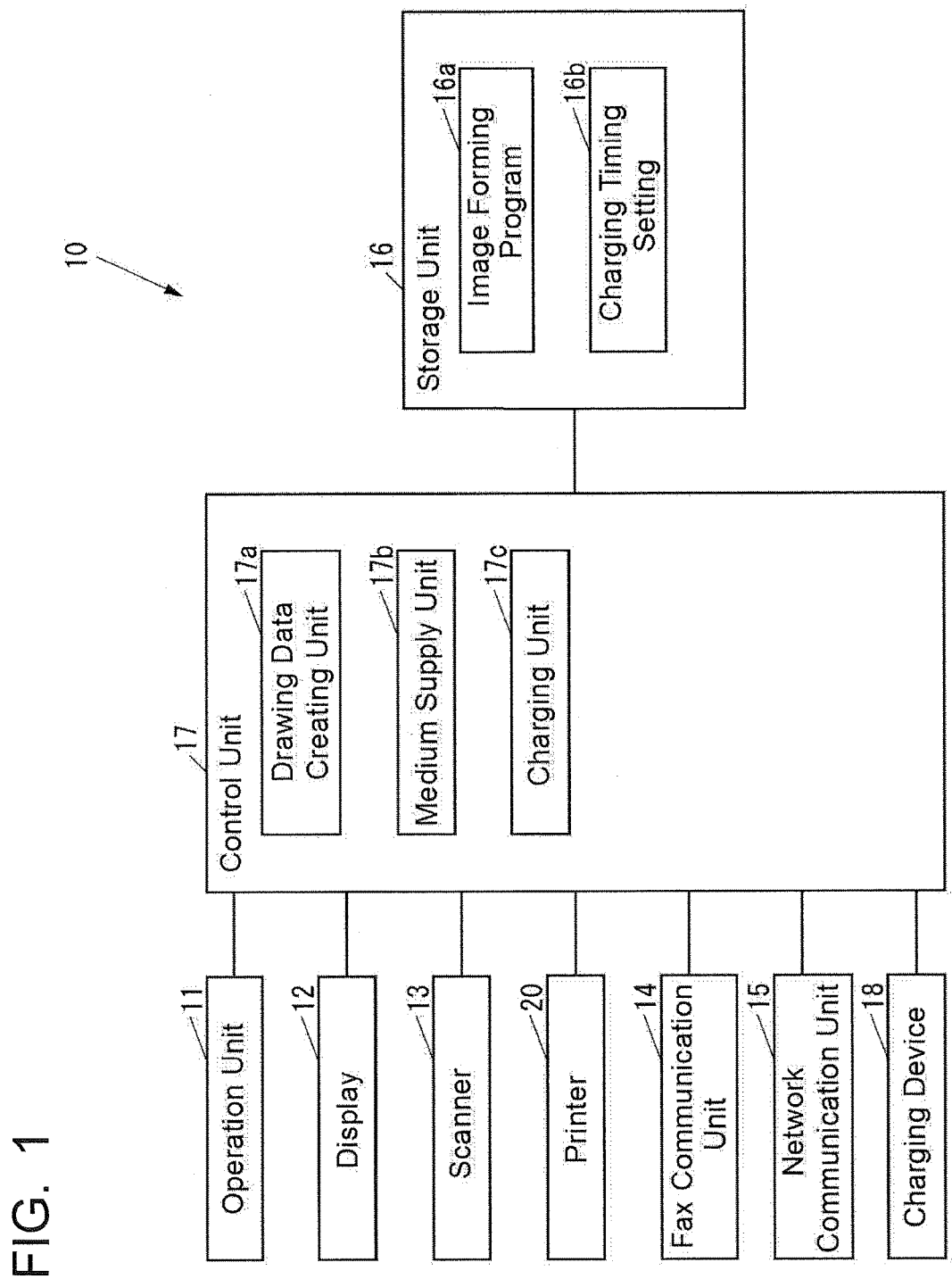
FIG. 1 illustrates an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, the following describes a configuration of a Multifunction Peripheral (MFP) as an image forming apparatus according to the embodiment.

FIG. 1 illustrates an MFP 10 according to the embodiment.

As illustrated in FIG. 1, the MFP 10 includes an operation unit 11, a display 12, a scanner 13, a printer 20, a fax communication unit 14, a network communication unit 15, a storage unit 16, and a control unit 17. The operation unit 11 is an input device such as a button for inputting various operations. The display 12 is a display device, such as a Liquid Crystal Display (LCD), which displays various pieces of information. The scanner 13, which is a reading device, reads images from a document. The printer 20 is a print device that has a mechanism to perform printing on a printing medium such as a paper sheet. The fax communication unit 14, which is a fax device, performs fax communications with an external facsimile device (not illustrated) via a communication line such as a dial-up line. The network communication unit 15, which is a network communication device, communicates with an external device via a network such as a Local Area Network (LAN) and the Internet. The storage unit 16, which is a non-volatile storage device such as a semiconductor memory and a Hard Disk Drive (HDD), stores various pieces of information. The control unit 17 controls the entire MFP 10.

On the MFP 10, a charging device 18, which performs a charging process for printing, is mounted. The charging device 18 includes, for example, a coin bender, which collects currency, such as coins, as a charging for printing each time printing is performed, and a key counter, which measures a printing amount corresponding to the charging for printing.

Figure 2:
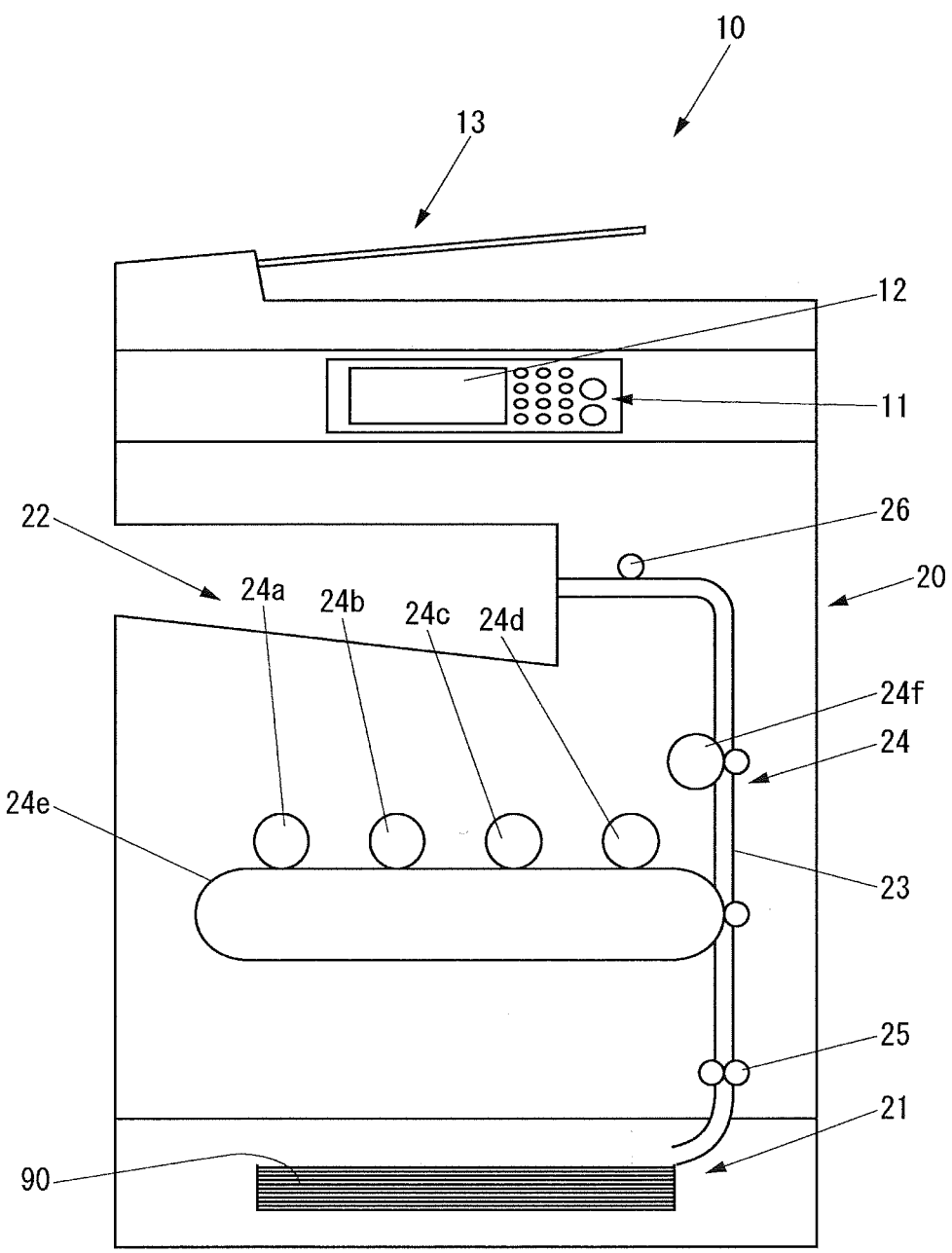
FIG. 2 illustrates an internal structure of the MFP according to the embodiment.

FIG. 2 illustrates a structure inside the MFP 10.

As illustrated in FIG. 2, the printer 20 includes a cassette 21, which supplies a printing medium 90, and a medium discharge member 22 from which the printing medium 90 is discharged.

The printer 20 includes a conveyance path 23 for the printing medium 90 from the cassette 21 to the medium discharge member 22. The printer 20 includes a large number of conveyance rollers (not illustrated) on the conveyance path 23. The conveyance rollers convey the printing medium 90 along the conveyance path 23.

The printer 20 includes a printing unit 24, which performs printing on the printing medium 90. The printing unit 24 includes photoreceptor drums 24*a* to 24*d*, a transfer belt 24*e*, and a fixing unit 24*f*. The photoreceptor drums 24*a* to 24*d* are photoreceptor drums for each of cyan, magenta, yellow, and black, which form images on the surfaces with toner. After the images, which are formed on the surfaces of the photoreceptor drums 24*a* to 24*d* with the toner, are transferred to the surface of the transfer belt 24*e*, the transfer belt 24*e* transfers the images transferred on the surface with toner to the printing medium 90. The fixing unit 24*f* fixes the image transferred from the transfer belt 24*e* on the printing medium 90 with toner to the printing medium 90.

The printer 20 includes a registration roller 25 and a discharge sensor 26. The registration roller 25 adjusts a timing of conveying the printing medium 90 such that the image transferred on the surface of the transfer belt 24*e* with toner is appropriately transferred to the printing medium 90. The discharge sensor 26 detects the discharge of the printing medium 90 to the medium discharge member 22.

As illustrated in FIG. 1, the storage unit 16, which is a non-transitory computer-readable recording medium, stores an image forming program 16*a* to control the MFP 10. The image forming program 16*a* may be installed on the MFP 10 at the production stage of the MFP 10, may be additionally installed from an external storage medium, such as an SD card and a universal serial bus (USB) memory, on the MFP 10, and may be additionally installed from a network on the MFP 10.

The storage unit 16 can store a charging timing setting 16*b*, which indicates a setting of charging timing. The charging timing setting 16*b* is settable according to an instruction via the operation unit 11 or the network communication unit 15. As settable timing by the charging timing setting 16*b*, any of timings at which the conveyance of the printing medium 90 starts from the cassette 21 with the conveyance rollers of the printer 20 (hereinafter referred to as a "supply start timing") and at which the conveyance rollers of the printer 20 terminate the conveyance of the printing medium 90 to the medium discharge member 22 (hereinafter referred to as a "discharge end timing") are settable. When the discharge end timing has been set, if opening the cover of the MFP 10 and removing the printing medium 90 to outside the MFP 10 after performing printing on the printing medium 90 by the printing unit 24 and before the already-printed printing medium 90 is discharged to the medium discharge member 22, an incorrect operation of not charging possibly occurs. When the supply start timing has been set, such incorrect operation can be prevented.

The control unit 17 is a hardware circuit that includes, for example, a Central Processing Unit (CPU), a Read Only Memory (ROM), which stores programs and various data, and a Random Access Memory (RAM) used as the work area for the CPU. The CPU executes the programs stored in the ROM or the storage unit 16.

By executing the image forming program 16*a* stored in the storage unit 16, the control unit 17 operates as a drawing data creating unit 17*a* (a drawing data creating circuit), a medium supply unit 17*b* (a medium supply circuit), and a charging unit 17*c* (a charging circuit). The drawing data creating unit 17*a* creates drawing data, which causes the printing unit 24 to perform printing, on each band in order. The medium supply unit 17*b* supplies the printing medium 90 to the printing unit 24. The charging unit 17*c* performs the charging process for printing.

The drawing data creating unit 17*a*, for example, creates the drawing data based on print data received from the external device via the network communication unit 15 and print data read from the external storage medium, such as an SD card and an USB flash drive, or the storage unit 16. The drawing data creating unit 17*a* creates the drawing data based on an image received from the external device via the network communication unit 15, an image read from the external storage medium, such as an SD card and an USB flash drive, or the storage unit 16, and an image read from the document by the scanner 13.

The print data includes a specified color of any one of monochrome and color. When the drawing data creating unit 17*a* creates the drawing data based on the image, a specified color of any one of monochrome and color is specified. The specified color can be specified via a printer driver of the external device or the operation unit 11.

To create the drawing data, the drawing data creating unit 17*a* fixes a color for use for printing, which is performed based on the drawing data by the printing unit 24. That is, the drawing data creating unit 17*a* includes a color conversion module. For example, even if a specified color is color, when the color included in the image, which is printed actually, is only an achromatic color, the color for use in the drawing data, which is created by the drawing data creating unit 17*a*, may be monochrome. That is, the color for use, which is fixed by the drawing data creating unit 17*a*, differs from the specified color in some cases. Accordingly, the charging unit 17*c* performs charging corresponding to not the specified color but the color for use fixed by the drawing data creating unit 17*a*. For example, the amount of money charged for printing of color printing per sheet is set higher than that of the monochrome printing.

Figure 3:
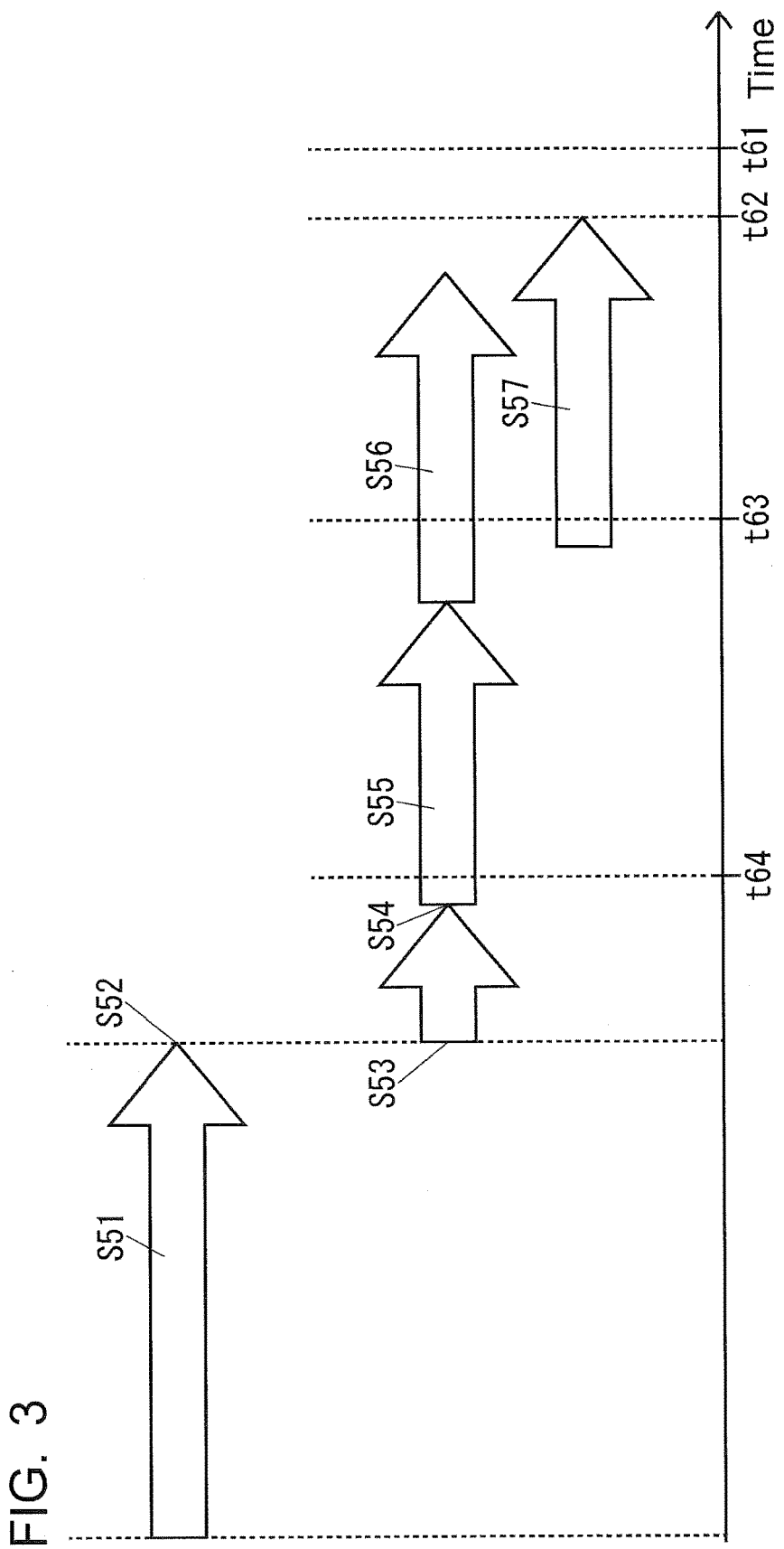
FIG. 3 illustrates an example of timings of various processes by a drawing data creating unit according to the embodiment.

FIG. 3 illustrates an example of timings of various processes by the drawing data creating unit 17*a*.

As illustrated in FIG. 3, the external device creates the print data (Step S51), and then starts transmission of the created print data to the MFP 10 (Step S52). Accordingly, the control unit 17 of the MFP 10 starts receiving the print data transmitted from the external device (Step S53), and then starts a job of printing based on the received print data (Step S54). Then, when performing the job started at Step S54, the drawing data creating unit 17*a* of the control unit 17 creates intermediate image data based on the print data (Step S55), and then rasterizes the intermediate image data created at Step S55 (Step S56). The drawing data creating unit 17*a* performs a color conversion process on the rasterized image data (Step S57) to create drawing data.

Figure 4:
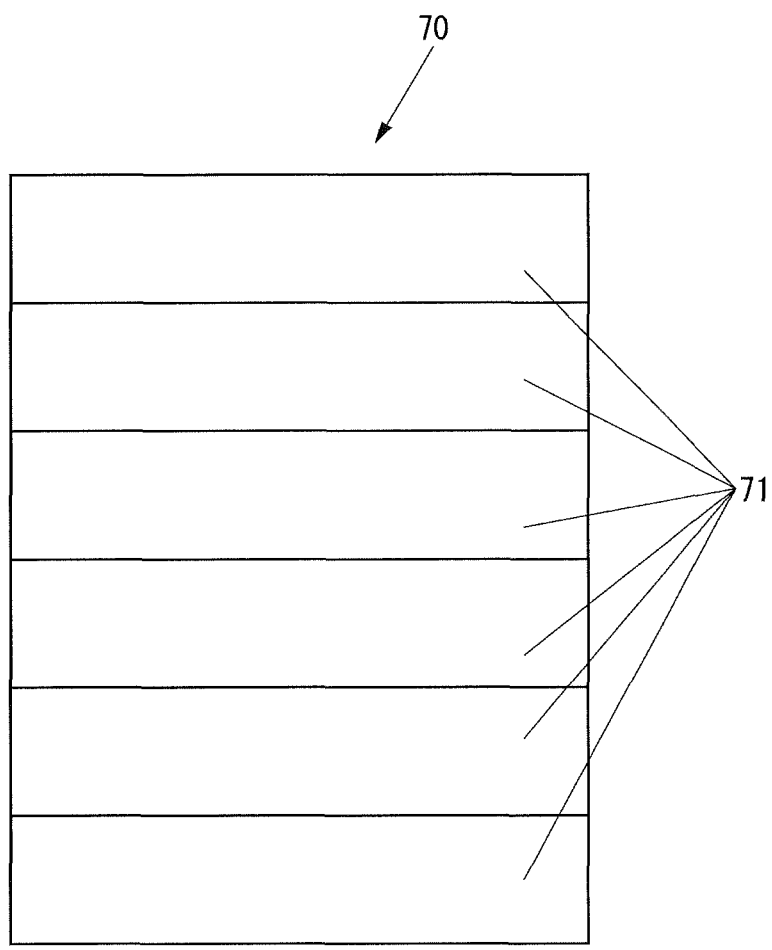
FIG. 4 illustrates a band processed by the drawing data creating unit according to the embodiment.

The drawing data creating unit 17*a*, as illustrated in FIG. 4, creates the drawing data for each area or each band 71, which is formed by dividing an area 70 of one page into a plurality of areas, in order. Here, the drawing data creating unit 17*a*, each time creating the band 71 of the drawing data, fixes a band-used color, which is used on each band 71 on printing performed by the printing unit 24 based on the drawing data, to any one of monochrome and color.

The drawing data creating unit 17*a*, after completion of creating the drawing data of one page, fixes the color for use on printing, which is performed by the printing unit 24 based on the drawing data, to any one of monochrome and color. That is, the drawing data creating unit 17*a*, when the band-used color of all the bands 71 of the drawing data of one page is monochrome, fixes the color for use as monochrome, and when at least one band-used color of the band 71 in the drawing data of one page is color, fixes the color for use as color.

In the example illustrated in FIG. 3, the drawing data creating unit 17*a* starts creating the drawing data based on the print data received from the external device via the network communication unit 15. However, the same applies when the drawing data creating unit 17*a* starts creating the drawing data based on other print data and image, such as print data input from the external storage medium such as an USB flash drive.

Figure 5:
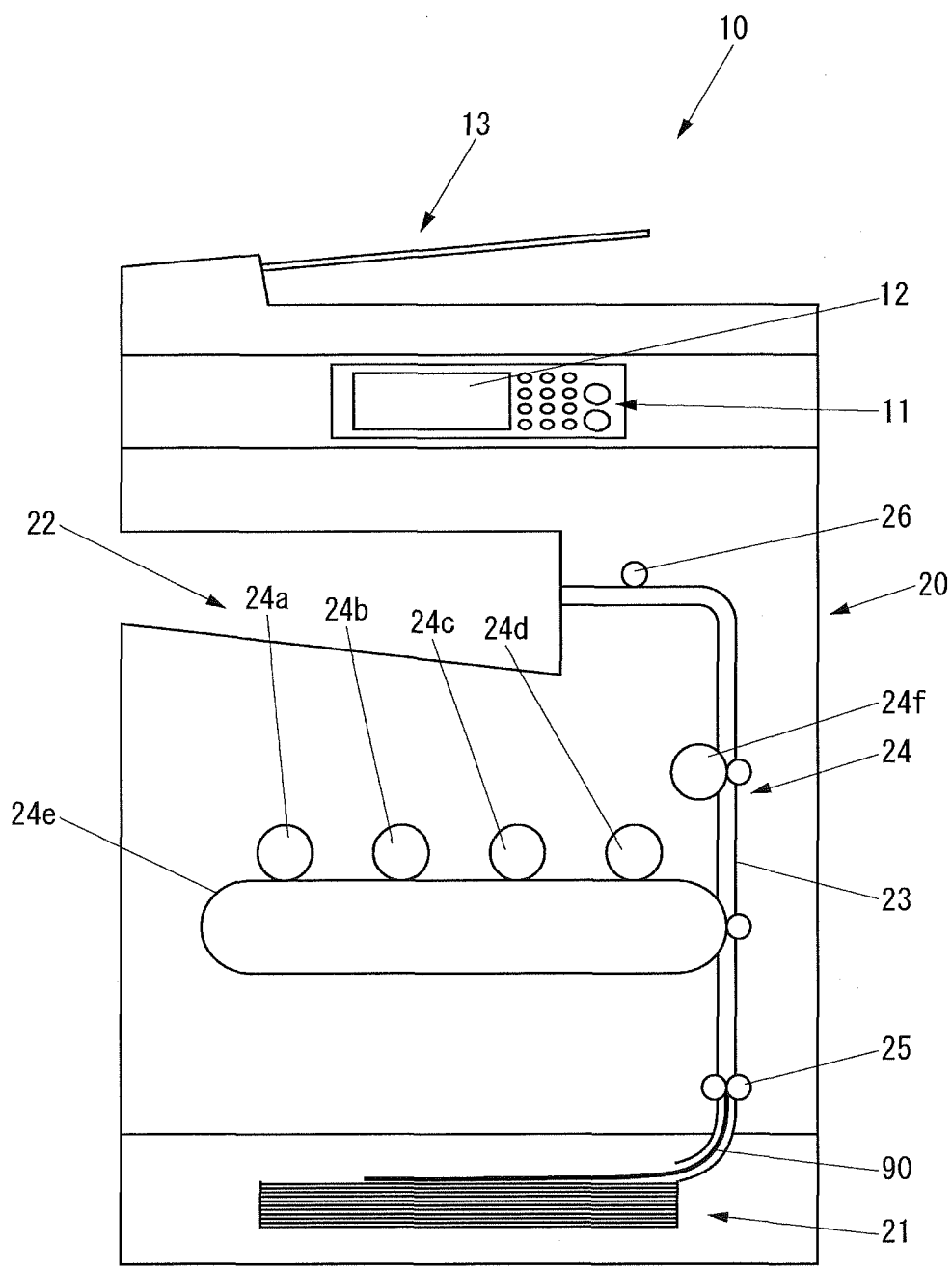
FIG. 5 illustrates the MFP according to the embodiment at a time point of completing execution of a primary supply.
Figure 6:
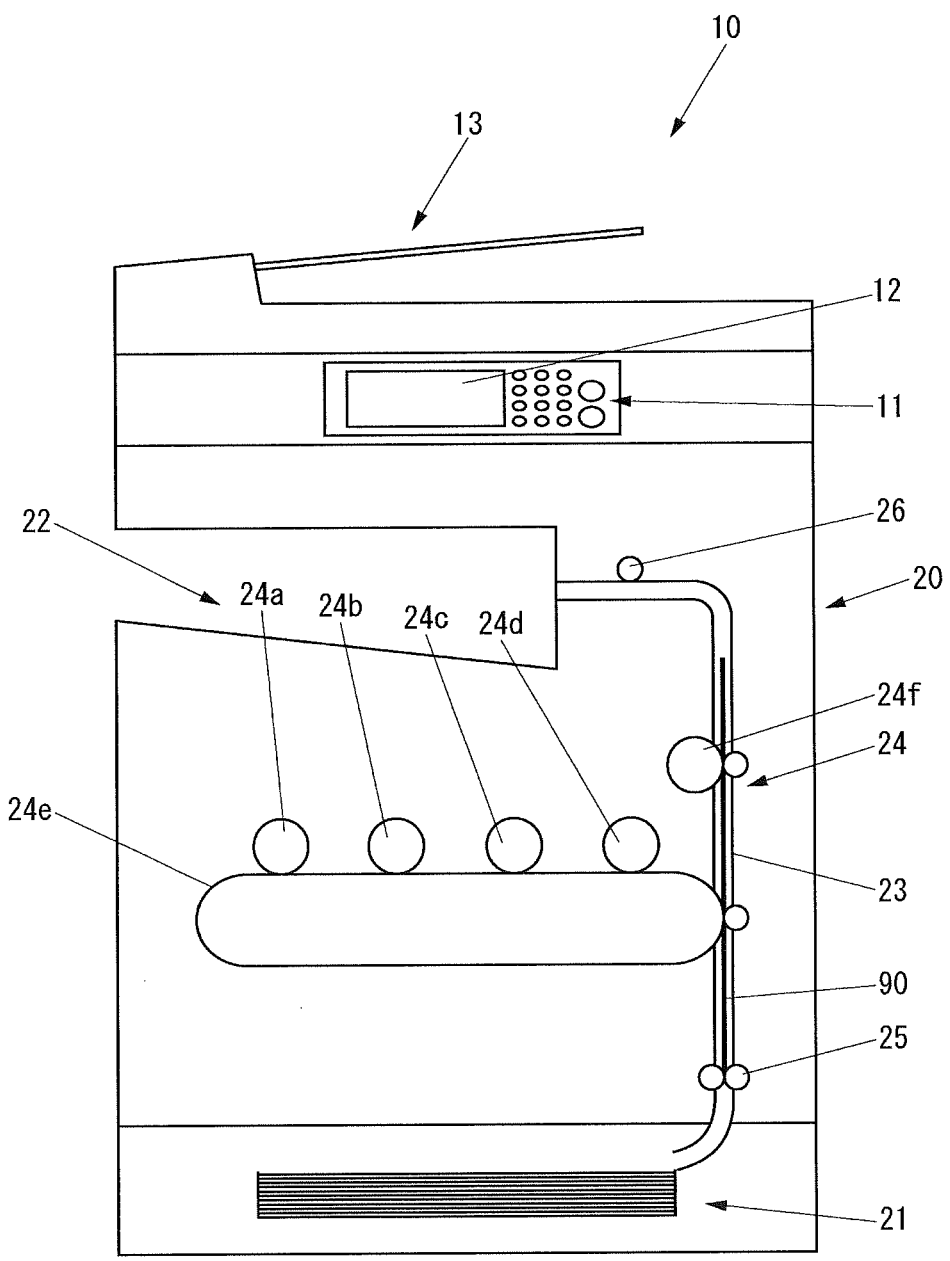
FIG. 6 illustrates the MFP according to the embodiment while a secondary supply is in execution.

The medium supply unit 17*b* illustrated in FIG. 1 performs the primary supply and the secondary supply. The primary supply, as illustrated in FIG. 5, supplies the printing medium 90 from the cassette 21 to a specific position, that is, a position of the registration roller 25. The secondary supply, as illustrated in FIG. 6, supplies the printing medium 90 from the position of the registration roller 25 to the printing unit 24, and then discharges the printing medium 90 to the medium discharge member 22.

The MFP 10 advances the printing medium 90 up to the position of the registration roller 25 beforehand by the primary supply, and then, as soon as preparation of a printing process, such as creation of the drawing data by the drawing data creating unit 17*a*, is completed, ensures execution of printing to the printing medium 90 by the printing unit 24 immediately by the secondary supply. Accordingly, the MFP 10 ensures improving a printing speed.

In the example illustrated in FIG. 3, for example, the secondary supply starts at a timing t61. The drawing data created by the color conversion process at Step S57 is compressed at a timing t62 where the color conversion process at Step S57 is terminated. Accordingly, the control unit 17 needs to perform the preparatory work before printing by the printing unit 24. The preparatory work includes, for example, decompression of the drawing data created by the color conversion process at Step S57, adjustment of the position of the drawing data based on margins set to the print data, and rotation of the drawing data corresponding to the rotation direction set to the print data. The control unit 17 processes the drawing data for each band. The medium supply unit 17*b* starts the secondary supply at a phase of completing the preparatory work by, for example, two bands. Accordingly, the timing t61 where the secondary supply starts is after the timing t62 where the color conversion process at Step S57 is terminated. The control unit 17 performs preparatory work for the remaining bands concurrently with the secondary supply.

In the example illustrated in FIG. 3, for example, the primary supply starts at any of the timing t62 where the color conversion process at Step S57 is terminated and a timing t63, which is previous of the timing t62. When a timing where the primary supply starts is the timing t63 prior to the timing t62, the timing t63 may not be the timing illustrated in FIG. 3 as long as after the start of Step S57.

The control unit 17 starts preparation of the printing unit 24, such as starting warming the fixing unit 24*f*, for example, at a timing t64, which is near the start timing of the process at Step S55. The timing t64 may be prior to the start timing of the process at Step S55, may be at the start timing of the process at Step S55, or may be after the start timing of the process at Step S55.

The charging unit 17*c* illustrated in FIG. 1, at a timing set at the charging timing setting 16*b*, performs charging based on the color for use fixed by the drawing data creating unit 17*a*.

Next, the following describes operations of the MFP 10.

Figure 7:
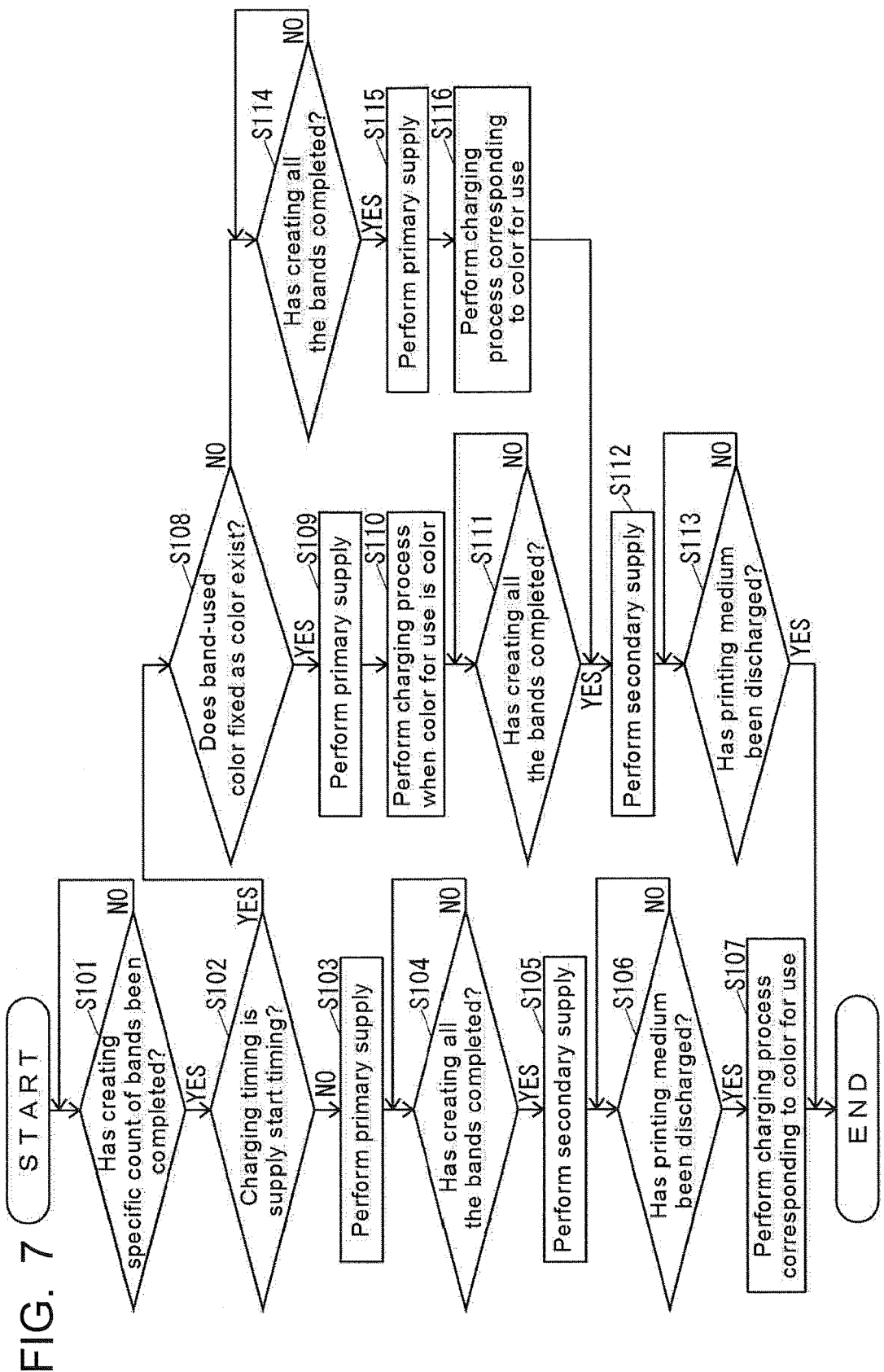
FIG. 7 illustrates operations of the MFP according to the embodiment to perform printing.

FIG. 7 illustrates the operations of the MFP 10 to perform printing.

As shown in FIG. 7, the medium supply unit 17*b*, until determining that the drawing data creating unit 17*a* has completed creating a specific numbers of bands, which number is smaller than the number of all the bands, of the drawing data, determines whether or not the drawing data creating unit 17*a* has completed creating the specific numbers of bands of the drawing data (Step S101).

The medium supply unit 17*b*, after determining that the drawing data creating unit 17*a* has completed creating the specific numbers of bands of the drawing data at Step S101, determines whether or not the charging timing is the supply start timing based on the charging timing setting 16*b* (Step S102).

The medium supply unit 17*b*, when determining that the charging timing is not the supply start timing, that is, the charging timing is the discharge end timing at Step S102, performs the primary supply (Step S103).

Next, the medium supply unit 17*b*, until determining that the drawing data creating unit 17*a* has completed creating all the bands of the drawing data, determines whether or not the drawing data creating unit 17*a* has completed creating all the bands of the drawing data (Step S104).

The medium supply unit 17*b*, after determining that the drawing data creating unit 17*a* has completed creating all the bands of the drawing data at Step S104, performs the secondary supply (Step S105).

Next, the charging unit 17*c*, until determining that the discharge sensor 26 has detected that the printing medium 90 has been discharged to the medium discharge member 22, determines whether or not the discharge sensor 26 has detected that the printing medium 90 has been discharged to the medium discharge member 22 (Step S106).

The charging unit 17*c*, after determining that the discharge sensor 26 has detected that the printing medium 90 has been discharged to the medium discharge member 22 at Step S106, performs the charging process corresponding to the color for use fixed by the drawing data creating unit 17*a* (Step S107), and then terminates the operations illustrated in FIG. 7.

The medium supply unit 17*b*, after determining that the charging timing is the supply start timing at Step S102, determines whether or not the band-used color fixed as color by the drawing data creating unit 17*a* exists among the colors for band use of the specific numbers of bands of the drawing data (Step S108).

The medium supply unit 17*b*, after determining that the band-used color fixed as color exists at Step S108, performs the primary supply (Step S109).

Next, the charging unit 17*c* performs the charging process when the color for use fixed by the drawing data creating unit 17*a* is color (Step S110).

Next, the medium supply unit 17*b*, until determining that the drawing data creating unit 17*a* has completed creating all the bands of the drawing data, determines whether or not the drawing data creating unit 17a has completed creating all the bands of the drawing data (Step S111).

The medium supply unit 17b, after determining that the drawing data creating unit 17a has completed creating all the bands of the drawing data at Step S111, performs the secondary supply (Step S112).

Next, the medium supply unit 17b, until determining that the discharge sensor 26 has detected that the printing medium 90 has been discharged to the medium discharge member 22, determines whether or not the discharge sensor 26 has detected that the printing medium 90 has been discharged to the medium discharge member 22 (Step S113).

The medium supply unit 17b, after determining that the discharge sensor 26 has detected that the printing medium 90 has been discharged to the medium discharge member 22 at Step S113, terminates the operations illustrated in FIG. 7.

The medium supply unit 17b, after determining that the band-used color fixed as color does not exist at Step S108, until determining that the drawing data creating unit 17a has completed creating all the bands of the drawing data, determines whether or not the drawing data creating unit 17a has completed creating all the bands of the drawing data (Step S114).

The medium supply unit 17b, after determining that the drawing data creating unit 17a has completed creating all the bands of the drawing data at Step S114, performs the primary supply (Step S115).

Next, the charging unit 17c performs the charging process corresponding to the color for use fixed by the drawing data creating unit 17a (Step S116).

Next, the medium supply unit 17b performs the process at Step S112.

As described above, the MFP 10, when color exists among the colors for band use (YES at Step S108), starts the primary supply prior to completion of creating all the bands of the drawing data (Step S109), and performs the charging process in the case where the color for use is color, in starting the primary supply (Step S110). This can improve the printing speed compared with a configuration that performs the charging process corresponding to the color for use fixed after completion of creating all the bands of the drawing data (YES at Step S114) in starting the primary supply (Step S116).

The MFP 10, when the band-used color fixed as color exists after completion of creating the specific numbers of bands, which number is smaller than the number of all the bands, of the drawing data, starts the primary supply prior to completion of creating all the bands of the drawing data, and performs the charging process in the case where the color for use is color, in starting the primary supply. This eliminates the need for performing determinations for starting the primary supply and performing the charging process each time the band-used color is fixed. Accordingly, the MFP 10 can reduce a process load compare with a configuration that the medium supply unit 17b determines the band-used color on each band for starting the primary supply until the band-used color fixed as color exists.

The MFP 10, when the charging timing is the supply start timing, may cause the medium supply unit 17b to determine the band-used color on each band for starting the primary supply until the band-used color fixed as color exists.

While the image forming apparatus of the disclosure is an MFP in this embodiment, the image forming apparatus may be an image forming apparatus other than the MFP such as a printer-only machine and a copy-only machine, as long as the image forming apparatus performs printing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
a printing mechanism that prints on a printing medium;
a drawing data creating circuit that creates drawing data for each band in order, the drawing data causing the printing mechanism to print;
a medium supply circuit that supplies the printing medium to the printing mechanism; and
a charging circuit that performs a charging process for printing,
wherein the medium supply circuit performs:
a primary supply supplying the printing medium to a specific position; and
a secondary supply supplying the printing medium from the specific position to the printing mechanism,
wherein the drawing data creating circuit fixes a band-used color used for each band in printing, performed based on the drawing data by the printing mechanism, to one of monochrome and color, the drawing data creating circuit fixing a color for use in printing, performed based on the drawing data by the printing mechanism, to one of monochrome and color,
wherein when the band-used color fixed as color by the drawing data creating circuit exists, the medium supply circuit starts the primary supply prior to completion of creating all the bands of the drawing data by the drawing data creating circuit, and
wherein when the band-used color fixed as color by the drawing data creating circuit exists, the charging circuit performs the charging process in a case where the color for use is color, in starting the primary supply.

2. The image forming apparatus according to claim 1,
wherein when the band-used color fixed as color by the drawing data creating circuit exists after completion of creating a specific count of bands of the drawing data by the drawing data creating circuit, the count being smaller than a count of all the bands, the medium supply circuit starts the primary supply prior to completion of creating all the bands of the drawing data by the drawing data creating circuit, and
wherein when the band-used color fixed as color by the drawing data creating circuit exists after completion of creating the specific count of bands by the drawing data creating circuit, the charging circuit performs the charging process in a case where the color for use is color, in starting the primary supply.

3. A non-transitory computer-readable recording medium storing an image forming program, the image forming program causing an image forming apparatus that includes a printing mechanism performing printing on a printing medium to operate as:
a drawing data creating circuit that creates drawing data for each band in order, the drawing data causing the printing mechanism to print;
a medium supply circuit that supplies the printing medium to the printing mechanism; and
a charging circuit that performs a charging process for printing,
wherein the medium supply circuit performs:
a primary supply supplying the printing medium to a specific position; and a secondary supply supplying the printing medium from the specific position to the printing mechanism, wherein the drawing data creating circuit fixes a band-used color used for each band in printing, performed based on the drawing data by the printing mechanism, to one of monochrome and color, the drawing data creating circuit fixing a color for use in printing, performed based on the drawing data by the printing mechanism, to one of monochrome and color, wherein when the band-used color fixed as color by the drawing data creating circuit exists, the medium supply circuit starts the primary supply prior to completion of creating all the bands of the drawing data by the drawing data creating circuit, and wherein when the band-used color fixed as color by the drawing data creating circuit exists, the charging circuit performs the charging process in a case where the color for use is color, in starting the primary supply.

\* \* \* \* \*